(12) United States Patent
Zhao et al.

(10) Patent No.: US 11,230,279 B2
(45) Date of Patent: Jan. 25, 2022

(54) METHOD AND SYSTEM FOR ADJUSTING DRIVER DEMAND TORQUE

(71) Applicant: Ford Global Technologies, LLC, Dearborn, MI (US)

(72) Inventors: Yanan Zhao, Ann Arbor, MI (US); Jason Meyer, Canton, MI (US); Roy S. Schafer, Saline, MI (US); Judhajit Roy, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 171 days.

(21) Appl. No.: 16/787,651

(22) Filed: Feb. 11, 2020

(65) Prior Publication Data

US 2021/0245727 A1 Aug. 12, 2021

(51) Int. Cl.
*B60W 20/10* (2016.01)
*F02D 41/10* (2006.01)
*B60L 15/20* (2006.01)
*B60W 10/06* (2006.01)
*B60W 10/08* (2006.01)

(52) U.S. Cl.
CPC .......... *B60W 20/10* (2013.01); *B60L 15/20* (2013.01); *B60W 10/06* (2013.01); *B60W 10/08* (2013.01); *F02D 41/10* (2013.01); *B60W 2540/10* (2013.01); *B60W 2720/30* (2013.01); *F02D 2200/1002* (2013.01); *F02D 2200/602* (2013.01)

(58) Field of Classification Search
CPC ...... B60W 20/10; B60W 10/06; B60W 10/08; B60W 2720/20; B60W 2540/10; F02D 41/10; F02D 41/1497; F02D 2200/062; F02D 2200/1002; F02D 2200/501; F02D 11/105; B60L 15/20; B60L 2240/423; B60L 15/2009
See application file for complete search history.

(56) References Cited

U.S. PATENT DOCUMENTS

| | | | |
|---|---|---|---|
| 6,862,511 B1 | 3/2005 | Phillips et al. | |
| 6,907,337 B2 | 6/2005 | Phillips et al. | |
| 9,031,766 B2 | 5/2015 | DeLaSalle et al. | |
| 2013/0096808 A1* | 4/2013 | DeLaSalle | F02D 41/0225 701/110 |
| 2013/0296136 A1* | 11/2013 | Doering | B60K 6/48 477/167 |
| 2015/0105949 A1* | 4/2015 | Wright | B60W 30/18009 701/22 |
| 2020/0039503 A1* | 2/2020 | Bowman | B60K 6/48 |

* cited by examiner

*Primary Examiner* — George C Jin
(74) *Attorney, Agent, or Firm* — David Kelley; McCoy Russell LLP (57) ABSTRACT

Methods and systems are provided for adjusting driver demand wheel torque of a vehicle. The driver demand wheel torque may be adjusted as a function of accelerator pedal position. In particular, at low accelerator pedal positions, a lead-in region of an accelerator pedal position to driver demand wheel torque relationship is adjustable responsive to vehicle operation conditions so that "dead pedal" feel may be avoided.

20 Claims, 4 Drawing Sheets

METHOD AND SYSTEM FOR ADJUSTING DRIVER DEMAND TORQUE

FIELD

The present application relates to methods and systems for adjusting a driver demand wheel torque of a vehicle.

BACKGROUND/SUMMARY

A driver demand wheel torque may be a basis for adjusting torque of a vehicle powertrain. The driver demand wheel torque may be based on input from an accelerator pedal, lever, mechanism, human/machine interface, or an autonomous driver.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
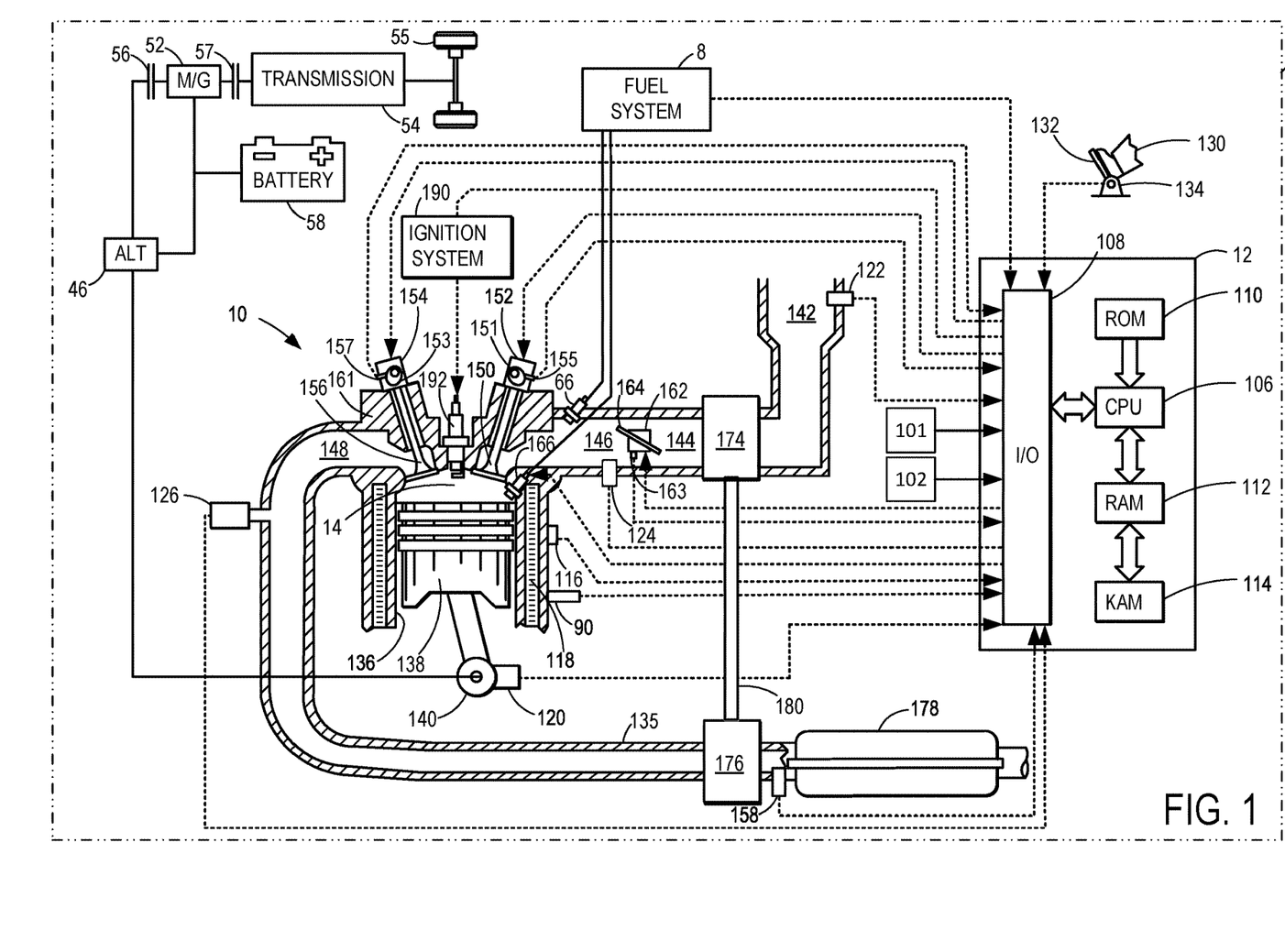
FIG. 1 shows a schematic depiction of an engine system of a vehicle.
Figure 2:
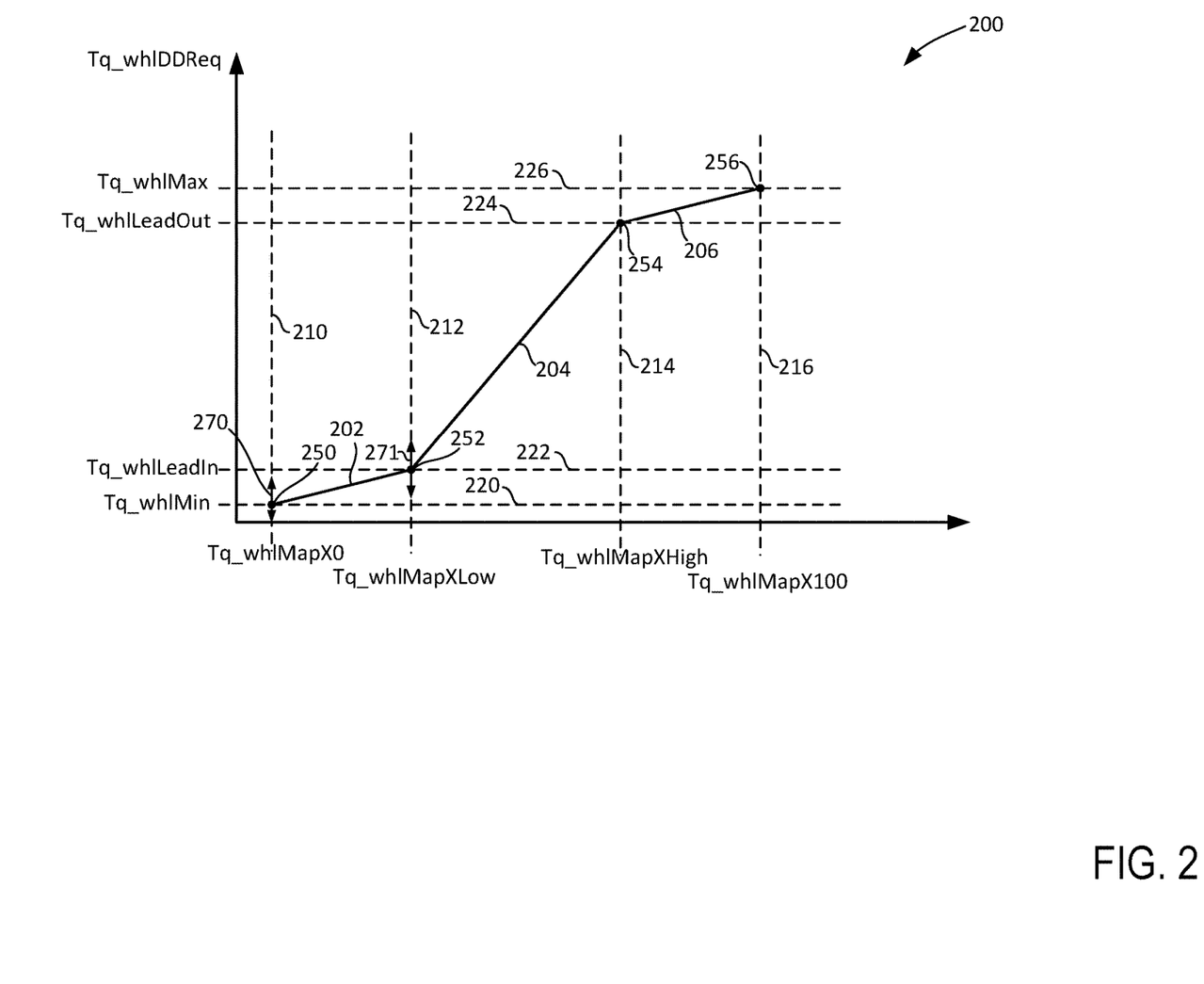
FIG. 2 shows a plot of an example relationship between a driver demand torque input device position or state and driver demand wheel torque.
Figure 3:
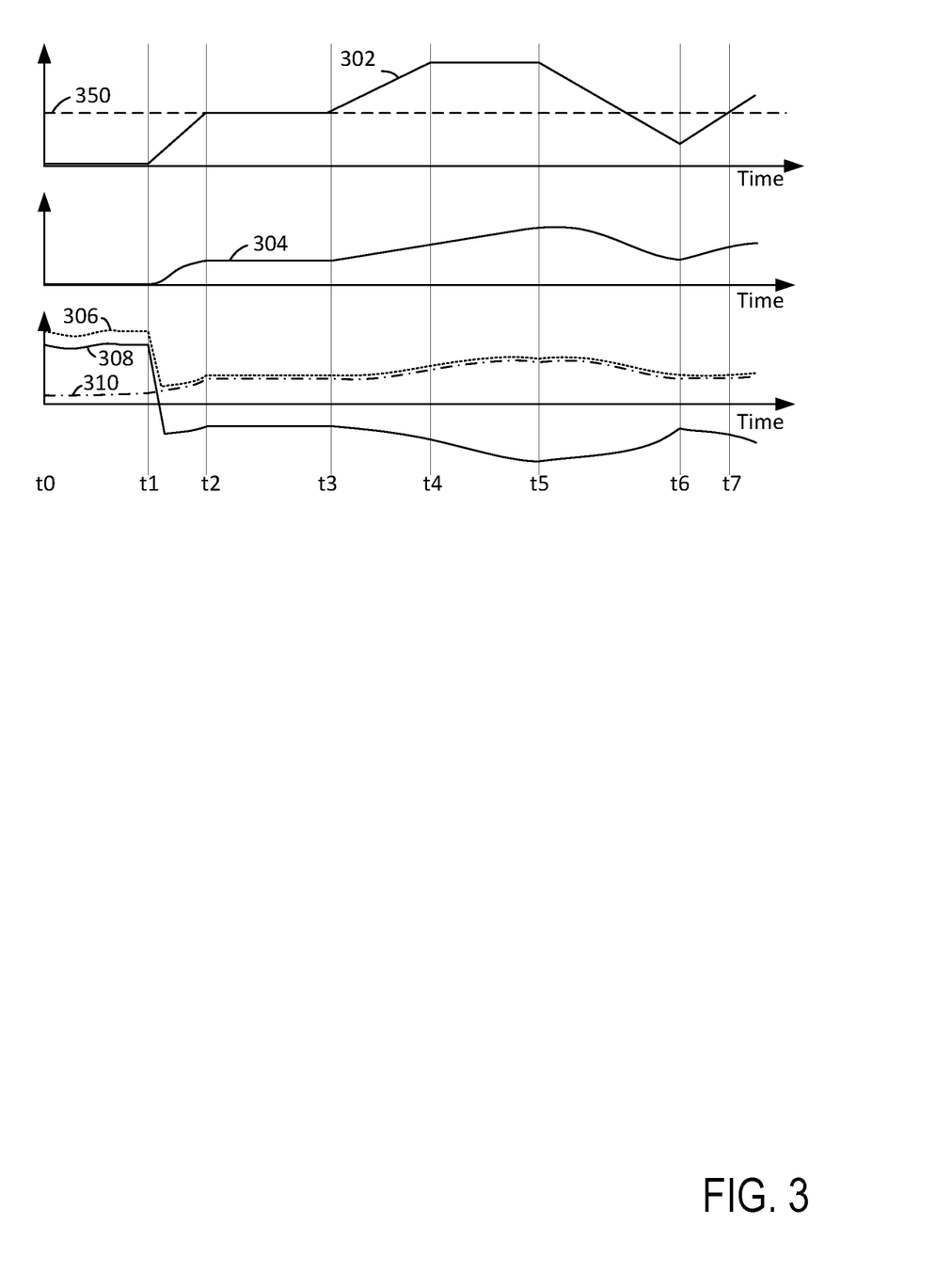
FIG. 3 shows an example vehicle operating sequence where the relationship between driver demand torque input device position or state and driver demand wheel torque is dynamically changed in response to vehicle operating conditions according to the method of FIG. 4.

The following description relates to systems and methods for operating a vehicle. The vehicle may include an internal combustion engine and/or an electric machine to provide propulsive force to the vehicle. The vehicle powertrain may be of the type that is shown in FIG. 1 or other known configurations. Wheel torque for the vehicle may be determined according to a map or relationship between a driver demand wheel torque input device (e.g., an accelerator pedal, lever, human/machine interface, or an autonomous driver) that may be applied to request wheel torque and a requested driver demand wheel torque amount as shown in FIG. 2. Breakpoints within the map or relationship may be adjusted according to vehicle operating conditions as shown in FIG. 3 so that the possibility of experiencing "dead pedal" feel may be avoided. A method for making adjustments to the map or relationship is provided in FIG. 4.

Driver demand wheel torque may be generated according to accelerator pedal position or a position or state of another device (e.g., a lever or an autonomous driver). However, for small applications of an accelerator pedal or other device, a vehicle's human or autonomous driver may experience "dead pedal" feel where little if any increase in actual wheel torque may be observed while applying the accelerator pedal. Further, a smooth wheel torque progression from small accelerator pedal displacements to larger accelerator pedal displacements may be desirable for vehicle drivability. Nevertheless, it may be difficult to avoid "dead pedal" feel and provide smooth wheel torque progression when there is a static relationship between a driver demand wheel torque input device position or state and driver demand wheel torque.

The inventors herein have recognized that a smooth wheel torque progression and avoidance of "dead pedal" feel may be provided via a method for operating a vehicle, comprising: dynamically adjusting a relationship between mapped driver demand wheel torque input and a requested driver demand wheel torque as a function of road load of a vehicle and a minimum wheel torque; and adjusting torque of a powertrain propulsion source as a function of the relationship between accelerator pedal position and driver demand wheel torque.

By dynamically adjusting a relationship between mapped driver demand wheel torque input and requested driver demand wheel torque as a function of a road load of a vehicle and a minimum wheel torque, it may be possible to avoid "dead pedal" feel and provide a smooth wheel torque progression. In one example, the relationship between mapped driver demand wheel torque input and requested driver demand wheel torque may be dynamically adjusted via adjust breakpoints that describe the relationship between mapped driver demand wheel torque input and requested driver demand wheel torque.

The present description may provide several advantages. In particular, the approach may reduce "dead pedal" feel. Further, the approach may provide a smooth torque progression when applying an accelerator pedal from an unapplied position. In addition, the approach may provide consistent vehicle acceleration and deceleration.

Turning now to the figures, FIG. 1 depicts an example of a cylinder 14 of an internal combustion engine 10, which may be included in a vehicle 5. Engine 10 may be a variable displacement engine (VDE), as described further below. Engine 10 may be controlled at least partially by a control system, including a controller 12, and by input from a human vehicle operator 130 via an input device 132. In this example, input device 132 includes an accelerator pedal and a pedal position sensor 134 for generating a proportional pedal position signal. However, in other examples, input device 132 may be a lever or other mechanism that may receive input from human operator 130. Alternatively, an autonomous driver (e.g., computer based driver) 101 may provide a driver demand wheel torque request to controller 12. In still other examples, human operator may input a driver demand wheel torque via human/machine interface 102. Human/machine interface may be a display panel or other known human/machine interface. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 of vehicle 5 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 57 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle examples, a system battery 58 may be a traction battery that delivers electrical power to electric machine 52 to provide torque to vehicle wheels 55. In some examples, electric machine 52 may also be operated as a generator to provide electrical power to charge system battery 58, for example, during a braking operation. It will be appreciated that in other examples, including non-electric vehicle examples, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted. In still other examples, engine 10 may be provided with an electric supercharger (e.g., an "eBooster"), and compressor 174 may be driven by an electric motor. In still other examples, engine 10 may not be provided with a boosting device, such as when engine 10 is a naturally aspirated engine.

A throttle 162 including a throttle plate 164 may be provided in the engine intake passages for varying a flow rate and/or pressure of intake air provided to the engine cylinders. For example, throttle 162 may be positioned downstream of compressor 174, as shown in FIG. 1, or may be alternatively provided upstream of compressor 174. A position of throttle 162 may be communicated to controller 12 via a signal from a throttle position sensor.

An exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO sensor. Emission control device 178 may be a three-way catalyst, a NOx trap, various other emission control devices, or combinations thereof. In the example of FIG. 1, emission control device 178 is a three-way catalyst.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. In this example, intake valve 150 may be controlled by controller 12 by cam actuation via cam actuation system 152, including one or more cams 151. Similarly, exhaust valve 156 may be controlled by controller 12 via cam actuation system 154, including one or more cams 153. The position of intake valve 150 and exhaust valve 156 may be determined by valve position sensors (not shown) and/or camshaft position sensors 155 and 157, respectively. Intake valve 150 and exhaust valve 156 reciprocate within cylinder head 161.

During some conditions, controller 12 may vary the signals provided to cam actuation systems 152 and 154 to control the opening and closing of the respective intake and exhaust valves. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of variable displacement engine (VDE), cam profile switching (CPS), variable cam timing (VCT), variable valve timing (VVT), and/or variable valve lift (VVL) systems that may be operated by controller 12 to vary valve operation. In alternative examples, intake valve 150 and/or exhaust valve 156 may be controlled by electric valve actuation. For example, cylinder 14 may alternatively include an intake valve controlled via electric valve actuation and an exhaust valve controlled via cam actuation, including CPS and/or VCT systems. In other examples, the intake and exhaust valves may be controlled by a common valve actuator (or actuation system) or a variable valve timing actuator (or actuation system).

As further described herein, intake valve 150 and exhaust valve 156 may be deactivated during VDE mode via electrically actuated rocker arm mechanisms. In another example, intake valve 150 and exhaust valve 156 may be deactivated via a CPS mechanism in which a cam lobe with no lift is used for deactivated valves. Still other valve deactivation mechanisms may also be used, such as for electrically actuated valves. In one example, deactivation of intake valve 150 may be controlled by a first VDE actuator (e.g., a first electrically actuated rocker arm mechanism, coupled to intake valve 150) while deactivation of exhaust valve 156 may be controlled by a second VDE actuator (e.g., a second electrically actuated rocker arm mechanism, coupled to exhaust valve 156). In alternate examples, a single VDE actuator may control deactivation of both intake and exhaust valves of the cylinder. In still other examples, a single cylinder valve actuator deactivates a plurality of cylinders (both intake and exhaust valves), such as all of the cylinders in an engine bank, or a distinct actuator may control deactivation for all of the intake valves while another distinct actuator controls deactivation for all of the exhaust valves of the deactivated cylinders. It will be appreciated that if the cylinder is a non-deactivatable cylinder of the VDE engine, then the cylinder may not have any valve deactivating actuators. Each engine cylinder may include the valve control mechanisms described herein. Intake and exhaust valves are held in closed positions over one or more engine cycles when deactivated so as to prevent flow into or out of cylinder 14.

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with a higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal from controller 12, under select operating modes. Spark timing may be adjusted based on engine operating conditions and driver torque demand. For example, spark may be provided at minimum spark advance for best torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock. An amount of energy supplied to spark plug 192 may be increased or decreased via adjusting an amount of time an ignition coil or electric energy device receives charge.

In some examples, each cylinder of engine 10 may be configured with one or more fuel injectors for providing fuel thereto. As a non-limiting example, cylinder 14 is shown including a direct fuel injector 166 and a port fuel injector 66. Fuel injectors 166 and 66 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal received from controller 12. Port fuel injector 66 may be controlled by controller 12 in a similar way. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injectors 166 and 66 from a fuel tank of fuel system 8 via fuel pumps and fuel rails. Further, the fuel tank may have a pressure transducer providing a signal to controller 12.

Fuel injectors 166 and 66 may be configured to receive different fuels from fuel system 8 in varying relative amounts as a fuel mixture and further configured to inject this fuel mixture directly into cylinder. For example, fuel injector 166 may receive alcohol fuel and fuel injector 66 may receive gasoline. Further, fuel may be delivered to cylinder 14 during different strokes of a single cycle of the cylinder. For example, directly injected fuel may be delivered at least partially during a previous exhaust stroke, during an intake stroke, and/or during a compression stroke. Port injected fuel may be injected after intake valve closing of a previous cycle of the cylinder receiving fuel and up until intake valve closing of the present cylinder cycle. As such, for a single combustion event (e.g., combustion of fuel in the cylinder via spark ignition), one or multiple injections of fuel may be performed per cycle via either or both injectors. The multiple DI injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 135; a crankshaft position signal from a Hall effect sensor 120 (or other type) coupled to crankshaft 140; throttle position from a throttle position sensor 163; signal UEGO from exhaust gas sensor 126, which may be used by controller 12 to determine the air-fuel ratio of the exhaust gas; engine vibrations (e.g., knock) via knock sensor 90; and an absolute manifold pressure signal (MAP) from a MAP sensor 124. An engine speed signal, RPM, may be generated by controller 12 from crankshaft position. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Controller 12 receives signals from the various sensors of FIG. 1 and employs the various actuators of FIG. 1 to adjust engine operation based on the received signals and instructions stored on a memory of the controller. For example, the controller may transition the engine to operating in VDE mode by actuating valve actuators 152 and 154 to deactivate selected cylinders.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

During selected conditions, such as when the full torque capability of engine 10 is not requested, one of a first or a second cylinder group may be selected for deactivation by controller 12 (herein also referred to as a VDE mode of operation). During the VDE mode, cylinders of the selected group of cylinders may be deactivated by shutting off respective fuel injectors 166 and 66. Further, valves 150 and 156 may be deactivated and held closed over one or more engine cycles. While fuel injectors of the disabled cylinders are turned off, the remaining enabled cylinders continue to carry out combustion, with corresponding fuel injectors and intake and exhaust valves active and operating. To meet torque requirements, the controller adjusts the amount of air entering active engine cylinders. Thus, to provide equivalent engine torque that an eight cylinder engine produces at 0.2 engine load and a particular engine speed, the active engine cylinders may operate at higher pressures than engine cylinders when the engine is operated with all engine cylinders being active. This requires higher manifold pressures, resulting in lowered pumping losses and increased engine efficiency. Additionally, the lower effective surface area (from only the active cylinders) exposed to combustion reduces engine heat losses, increasing the thermal efficiency of the engine.

Thus, the system of FIG. 1 provides for a system for operating a powertrain, comprising: a propulsion source; and a controller including executable instructions stored in non-transitory memory that cause the controller to adjust a torque of the propulsion source in response to a table or function that describes a relationship between a driver demand wheel torque input device and a driver demand wheel torque, the table or function including a lead-in region that is defined by two breakpoints, the two breakpoints dynamically adjustable according to vehicle operating conditions. The system includes where a first of the two breakpoints defines a minimum wheel torque. The system includes where driver demand wheel torque of the lead-in region decreases as an accelerator pedal application amount decreases up to a minimum wheel torque. The system includes where the propulsion source is an internal combustion engine. The system includes where the propulsion source is an electric machine. The system includes where the lead-in region ends when driver demand torque is equal to a road load of a vehicle. The system includes where the lead-in region ends when driver demand torque is equal to a minimum driver demand wheel torque plus an offset torque value.

FIG. 2 shows an example relationship between a driver demand wheel torque input device (e.g., an accelerator pedal, lever, human/machine interface, or an autonomous driver) and a commanded or requested driver demand wheel torque. The horizontal axis represents a mapped wheel torque that is determined from a position or a state of a driver demand wheel torque input device (e.g., accelerator pedal position) and vehicle speed. The driver demand wheel torque input device is in a base position, or not applied, where the horizontal axis is intersected by vertical line 210. The driver demand wheel torque input device is in a fully applied position where the horizontal line is intersected by line 216. Thus, the driver demand wheel torque input device is not applied at the left side of the horizontal axis, and the application amount of the driver demand wheel torque input device increases to the right side of plot 200. The vertical axis represents commanded or requested driver demand wheel torque, and the amount of the requested driver demand wheel torque increases in the direction of the vertical axis arrow.

The mapped driver demand wheel torque input to requested driver demand wheel torque relationship is represented by line segments 202, 204, and 206. Line 202 may be referred to as a lead-in line segment of the mapped driver demand wheel torque input to requested driver demand wheel torque relationship because it starts from the base or unapplied driver demand wheel torque input device base position. Line 204 may be referred to as a middle line segment of the mapped driver demand wheel torque input to requested driver demand wheel torque relationship. Line 206 may be referred to as a lead-out line segment of the mapped driver demand wheel torque input to requested driver demand wheel torque relationship because line segment 206 ends with the driver demand wheel torque input device being fully applied.

A first breakpoint 250 defines a first end of lead-in line segment 202. Second breakpoint 252 defines a second end of lead-in line segment 202 and a first end of middle line segment line segment 204. Third breakpoint 254 defines a second end of middle line segment line segment 204 and a first end of lead-out line segment 206. The other end of lead-out line segment 206 is defined by fourth breakpoint 256. Breakpoints 250, 252, 254, and 256 may be dynamically adjusted with respect to the vertical axis (e.g., the driver demand wheel torque request) in response to vehicle operating conditions as discussed in further detail with respect to method 400.

The first breakpoint 250 is shown at the intersection of vertical line 210 and horizontal line 220. Vertical line 210 represents the base or not applied position of the mapped driver demand wheel torque input. Vertical line 210 also represents a beginning or first side of a lead-in region for the mapped driver demand wheel torque input that extends between vertical line 210 and vertical line 212. Horizontal line 220 represents the minimum wheel torque request (e.g., the wheel torque request may not be less than the value of the minimum wheel torque request). The minimum wheel torque request Tq_whlMin may be adjusted in the direction indicated by arrows 270 according to vehicle operating conditions as discussed in greater detail in the description of FIG. 4.

The second breakpoint 252 is shown at the intersection of vertical line 212 and horizontal line 222. Vertical line 212 represents the end of the lead-in region of the mapped driver demand wheel torque input. Vertical line 212 also represents a beginning of the middle line segment region of the mapped driver demand wheel torque input that extends to vertical line 214. Horizontal line 222 represents the maximum wheel torque request of the lead-in region. The maximum torque for the lead-in region Tq_whlLeadIn may be adjusted in the direction of the arrows 271 according to vehicle operating conditions as discussed in greater detail in the description of FIG. 4.

The third breakpoint 254 is shown at the intersection of vertical line 214 and horizontal line 224. Vertical line 214 represents the end of the middle line segment region of the mapped driver demand wheel torque input. Vertical line 214 also represents a beginning of the lead-out region of the mapped driver demand wheel torque input that extends to vertical line 216. Horizontal line 224 represents the maximum wheel torque request of the middle line segment region and the minimum wheel torque of the lead-out region.

The fourth breakpoint 256 is shown at the intersection of vertical line 216 and horizontal line 226. Vertical line 216 represents the fully applied position of the mapped driver demand wheel torque input. Vertical line 216 also represents the end of the lead-out region for the mapped driver demand wheel torque input. Horizontal line 226 represents the maximum wheel torque request (e.g., the wheel torque request may not be greater than the value of the maximum wheel torque request).

The lead-in line portion of the relationship between a mapped driver demand wheel torque input and a commanded or requested driver demand wheel torque (e.g., line 202) provides a gradual increase in requested driver demand wheel torque for an increase in the application amount of the mapped driver demand wheel torque input. The slope of the line segment 202 may be increased or decreased in response to vehicle operating conditions so that "dead pedal" feel may be avoided. The slope of line segment 202 may be changed via adjusting the value of Tq_whlLeadIn or the value of Tq_whlMin dynamically as a function of vehicle operating conditions. Tq_whlMapX0 represents the mapped driver demand input at fully released position of the driver demand wheel torque input device and Tq_whlMapXLow is the mapped driver demand input at the position of the driver demand wheel torque input device at which the lead-in region stops (e.g., 10% of a fully applied driver demand wheel torque input device). In one example, Tq_whlMapXLow=Tq_whlXRL, or the mapped driver demand input at position of the driver demand wheel torque input device at which the lead-in region stops is equal to the mapped driver demand input at road load of the vehicle (Tq_whlXRL). Thus, the lead-in line portion and the lead-out line portion have lower gains (e.g., rates of change of driver demand torque as a function of accelerator pedal position) than the middle line section.

Figure 4:
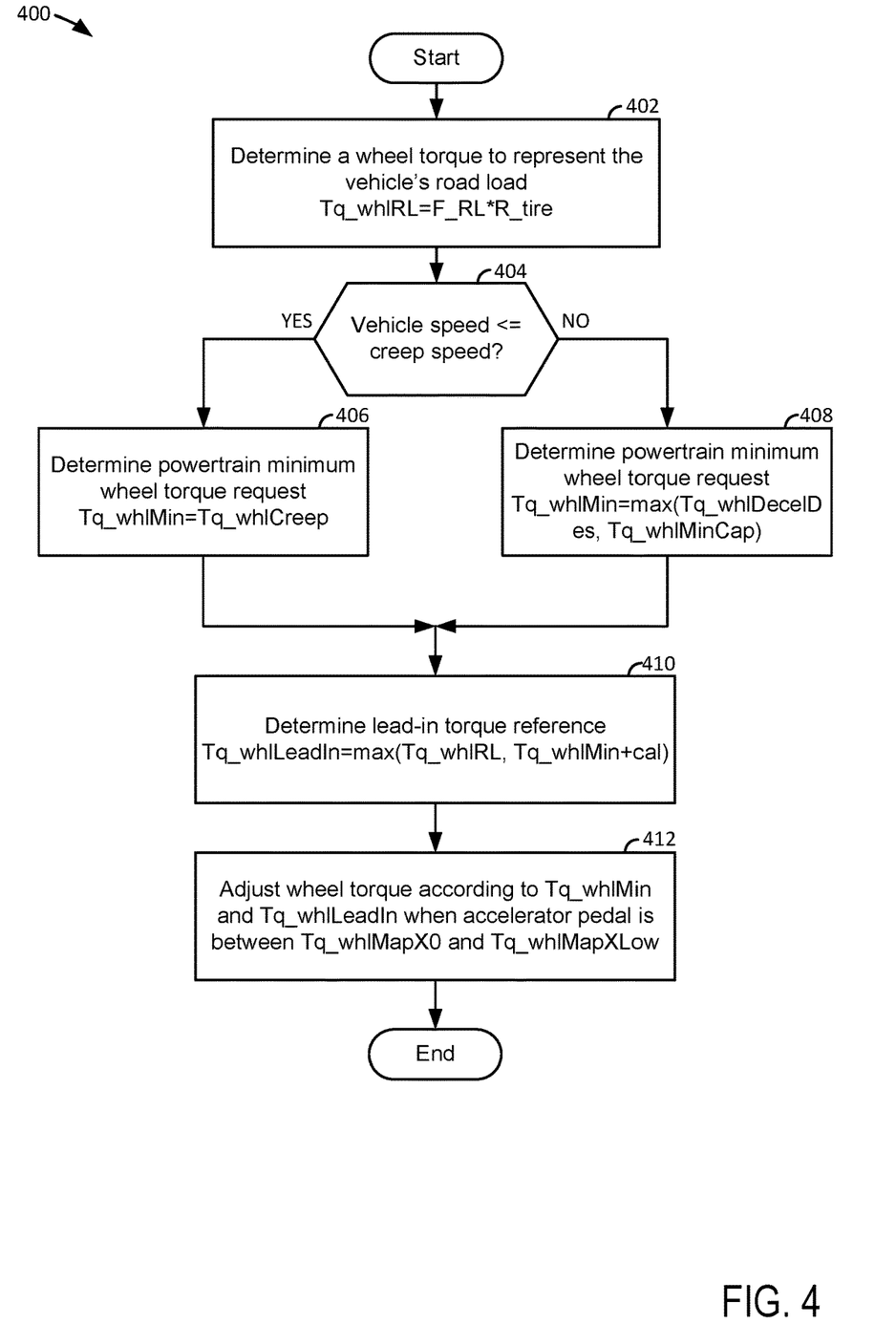
FIG. 4 shows an example method for determining and outputting driver demand wheel torque.

Referring now to FIG. 3, a vehicle operating sequence according to the method of FIG. 4 as applied to the system of FIG. 1 is shown. The sequence of FIG. 3 includes three plots and the plots are aligned in time. Vertical lines at times t0-t7 represent times of interest in the sequence.

The first plot from the top of FIG. 3 is a plot of accelerator pedal position versus time. The accelerator pedal is fully closed when trace 302 is at the level of the horizontal axis. The accelerator is fully opened or applied when trace 302 is near the arrow of the vertical axis. The horizontal line represents time and time increases from the left side of the plot to the right side of the plot. Horizontal line 350 represents a position of the accelerator pedal at which the powertrain output torque to the wheels is equal to the vehicle's road load. Trace 302 represents the position of the accelerator pedal.

The second plot from the top of FIG. 3 is a plot of vehicle speed versus time. The vehicle speed is zero when trace 304 is at the level of the horizontal axis. The vehicle speed increases in the direction of the vertical axis arrow. The horizontal line represents time and time increases from the left side of the plot to the right side of the plot. Trace 304 represents the vehicle speed.

The third plot from the top of FIG. 3 is a plot of vehicle wheel torque versus time. The vertical axis represents wheel torque and wheel torque increases in the direction of the vertical axis arrow. The wheel torque is zero at the level of the horizontal axis. The horizontal line represents time and time increases from the left side of the plot to the right side of the plot. Trace 306 represents the maximum torque for the lead-in region Tq_whlLeadIn. Trace 310 represents the road load wheel torque for the vehicle Tq_whlRL. Trace 3080 represents the minimum wheel torque request Tq_whlMin.

At time t0, the accelerator pedal is not applied and vehicle speed is zero. The minimum wheel torque request Tq_whlMin is at a higher level and the maximum torque for the lead-in region Tq_whlLeadIn is at a higher level. The road load wheel torque for the vehicle Tq_whlRL is at a lower level.

At time t1, the accelerator pedal is applied and it continues to be applied at greater levels until time t2. The vehicle speed begins to increase and the minimum wheel torque request Tq_whlMin is reduced such that it reaches a negative value before time t2. The maximum torque for the lead-in region Tq_whlLeadIn also decreases, but it remains a positive value. The road load wheel torque for the vehicle Tq_whlRL increases as vehicle speed increases. The road load wheel torque is important because it sometimes defines the value of the maximum torque for the lead-in region Tq_whlLeadIn. In this example, the lead-in region maximum torque is equal to the road load wheel torque for the vehicle Tq_whlRL shortly after time t1. The small separation between Tq_whlLeadIn and Tq_whlRL is provided to improve observability.

At time t2, the accelerator pedal position is equal to a position where wheel torque is equal to the vehicle road load wheel torque. The vehicle speed levels off and it is constant up to time t3. The maximum torque of the lead-in region Tq_whlLeadIn also levels off at a constant value and it is equal to the road load wheel torque for the vehicle Tq_whlRL. The minimum wheel torque request Tq_whlMin levels off at a negative value.

At time t3, the accelerator pedal is applied further causing the vehicle speed to increase between time t3 and time t4. The maximum torque of the lead-in region Tq_whlLeadIn increases as the vehicle speed increases and the road load wheel torque for the vehicle Tq_whlRL also increases as the vehicle speed increases. The minimum wheel torque request Tq_whlMin moves to an increasingly negative value.

At time t4, the accelerator pedal levels off at a higher value and the vehicle speed continues increasing. The maximum torque of the lead-in region Tq_whlLeadIn increases as the vehicle speed continues to increases and the road load wheel torque for the vehicle Tq_whlRL continues to increase as the vehicle speed increases. The minimum wheel torque request Tq_whlMin moves to an increasingly negative value.

At time t5, the accelerator pedal position is reduced from the higher value and the vehicle speed begins to decrease shortly after time t5. The maximum torque of the lead-in region Tq_whlLeadIn begins to decrease as the vehicle speed decreases and the road load wheel torque for the vehicle Tq_whlRL decreases as the vehicle speed decreases. The minimum wheel torque request Tq_whlMin begins to increase shortly after time t5 as vehicle speed decreases.

At time t6, the accelerator pedal is applied further and the accelerator pedal position begins to increase. The maximum torque of the lead-in region Tq_whlLeadIn begins to increase as the vehicle speed increases and the road load wheel torque for the vehicle Tq_whlRL also begins to increase as the vehicle speed increases. The minimum wheel torque request Tq_whlMin moves to a negative value having a larger magnitude.

At time t7, the accelerator pedal position has increased to a position that is equal to a position where wheel torque is equal to the vehicle road load wheel torque. The vehicle speed continues to increase. The maximum torque of the lead-in region Tq_whlLeadIn continues to increase and the road load wheel torque for the vehicle Tq_whlRL continues to increase. The minimum wheel torque request Tq_whlMin levels continues to a larger magnitude negative value.

In this way, breakpoints of a relationship between a mapped driver demand wheel torque input and a commanded or requested driver demand wheel torque may be adjusted to improve vehicle drivability.

Referring now to FIG. 4, a method for adjusting a relationship between a mapped driver demand wheel torque input and a commanded or requested driver demand wheel torque is shown. The mapped driver demand wheel torque may be determined from accelerator pedal and vehicle speed, for example. The method of FIG. 4 may be included in the system of FIG. 1 as executable instructions stored in non-transitory memory. The method of FIG. 4 may operate in cooperation with the system of FIG. 1 to adjust operating states of devices (e.g., actuators) in the physical world.

At 402, method 400 determines a wheel torque that represents the vehicle's road load. In one example, method 400 determines a road load force according to the following equation:

$$F_{RL} = a + b \cdot vspd + c \cdot vspd^2$$

where $F_{RL}$ is the road load force, where a, b, and c are real numbers that may be empirically determined via vehicle coast down data, and where vspd is vehicle speed. Alternatively, the road load force may be determined via the following equation:

$$F_{RL} = F_{aero} + F_{rr} + F_{grade} = \frac{1}{2} \cdot rho \cdot vspd^2 \cdot cd \cdot A + m \cdot g \cdot c_{rr} + m \cdot g \cdot \sin(\theta)$$

where $F_{RL}$ is the road load force, $F_{aero}$ is the aerodynamic drag force applied to the vehicle, $F_{rr}$ is the rolling resistance force applied to the vehicle, $F_{grade}$ is the force applied to the vehicle due to road grade, rho is the density of the air, cd is coefficient of drag of the vehicle, A is the frontal area of the vehicle, m is vehicle mass, g is the gravitational constant, $c_{rr}$ is coefficient of rolling resistance, and θ is the grade of the road being traveled upon by the vehicle.

Method 400 determines the road load wheel torque from the road load force by the following equation:

$$Tq\_whlRL = F_{RL} \cdot R\_tire$$

where Tq_whlRL is the road load wheel torque, $F_{RL}$ is the road load that is applied to the tire, and R_tire is the radius of the tire that is mounted to the vehicle's wheel. Method 400 proceeds to 404.

At 404, method 400 judges if the vehicle's present speed is less than or equal to the vehicle's creep speed. If so, the answer is yes and method 400 proceeds to 406. Otherwise, the answer is no and method 400 proceeds to 408. The vehicle's creep speed may be a constant speed that the vehicle travels at after the vehicle's brake pedal has been fully released after the vehicle has come to a complete stop, while the accelerator pedal has not been applied since the brake pedal was released, and while the vehicle is traveling on a flat road.

At 406, method 400 adjusts the minimum wheel torque value (Tq_whlMin) in the relationship between the mapped driver demand wheel torque input and a commanded or requested driver demand wheel torque. In particular, the minimum wheel torque is adjusted to equal the wheel creep torque (Tq_whlCreep). The wheel creep torque may be a predetermined torque amount that causes the vehicle to travel at the vehicle's creep speed while the vehicle is traveling on a flat road, after the vehicle's brake pedal has been fully released after the vehicle has come to a complete stop, and while the accelerator pedal has not been applied since the brake pedal was released. The wheel creep torque may be empirically determined via the following equation:

$$Tq\_whlCreep = f(Nidle\_des, Nt\_creep)$$

where Tq_whlCreep is the wheel creep torque, f is a function that returns the wheel creep torque, Nidle_des is the desired engine idle speed, and Nt_creep is the turbine speed corresponding to vehicle creep speed. Method 400 proceeds to 410.

At 408, method 400 determines the minimum driver demand wheel torque value via the following equation:

$$Tq\_whlMin = max(Tq\_whlDecelDes, Tq\_whlMinCap)$$

where Tq_whlMin is the minimum driver demand wheel torque in the relationship between the mapped driver demand wheel torque input and a commanded or requested driver demand wheel torque (e.g., as shown in FIG. 2), max is a function that returns the greater value of a first argument (Tq_whlDecelDes) and a second argument (Tq_whlMinCap), Tq_whlDecelDes is the driver demand wheel torque that provides a desired rate of vehicle deceleration, and Tq_whlMinCap is the powertrain's minimum torque capability that may be a function of engine friction and/or battery charging capacity. The powertrain's minimum torque capability may be determined from an engine friction torque, a charging torque determined from a high voltage battery and electric machine capability charging torque that is based on powertrain configuration. Tq_whlDecelDes may be a function of vehicle speed. Method 400 proceeds to 410.

At 410, method 400 determines the lead-in torque value via the following equation:

$$Tq\_whlLeadIn = max(Tq\_whlRL, Tq\_whlMin + cal)$$

where Tq_whlLeadIn is the maximum torque of the lead-in region of the relationship between the mapped driver demand wheel torque input and a commanded or requested driver demand wheel torque (e.g., as shown in FIG. 2). Max is a function that returns the greater value of a first argument (Tq_whlRL) and a second argument (Tq_whlMin+cal), Tq_whlRL is the vehicle's road load wheel torque, Tq_whlMin is a minimum wheel torque request of the vehicle, and cal is a calibratable or adjustable offset value.

For example, if Tq_whlRL is 20 Newton-meters and Tq_whlMin+cal is 15 Newton meters, max returns a value of 20 Newton-meters. At vehicle speed less than or equal to vehicle creep speed, Tq_whlLeadIn is adjusted to Tq_whlMin+cal. The value of variable cal may be a function of vehicle speed.

The breakpoints of the relationship between a mapped driver demand wheel torque input and a commanded or requested driver demand wheel torque as shown in FIG. 2 are adjusted according to the maximum torque of the lead-in region of the relationship. In particular, breakpoint 252 shown in FIG. 2 is adjusted directionally as indicated by arrows 271. Line segment 202 stretches between breakpoints 250 and 252 and it is adjusted when the breakpoints are adjusted since line segment 202 is the shortest distance between breakpoints 250 and 252. The requested driver demand wheel torque may be determined in the lead-in region according to the driver demand wheel torque input device and line segment 202. For example, when the mapped driver demand wheel torque input is less than Tq_whlMapXLow and greater than Tq_whlMapX0, the drive demand wheel torque may be given by the following equation:

$$DD\_whlTq = m(DDinp) + b$$

where DD_whlTq is the driver demand wheel torque, m is the slope of line segment 202, DDinp is the position of the driver demand wheel torque input device, and b is the slope of line segment 202. The slope of line segment 202 may be determined via the following equation:

$$Slope = \frac{Tq\_whlLeadIn - Tq\_whlMin}{Tq\_whlMapXLow - Tq\_whlMapX0}$$

The value of b may be determined via solving for the driver demand wheel torque at the breakpoint at the end of the lead-in region (e.g., 252 of FIG. 2). Driver demand wheel torque and slopes for the other line segments shown in FIG. 2 may be determined in a similar way. Method 400 proceeds to 412.

At 412, method 400 adjusts a wheel torque of the vehicle according to a relationship between a mapped driver demand wheel torque input and a commanded or requested driver demand wheel torque. The relationship may include a lead-in region as shown in FIG. 2. The wheel torque in the lead-in region may be determined via the driver demand wheel torque DD_whlTq equation described at 410. Method 400 adjusts torque output of a torque source (e.g., internal combustion engine or electric machine) to provide the requested driver demand wheel torque. For example, method 400 may adjust a throttle position, fuel injection timing, and cam timing so that the engine delivers the requested driver demand wheel torque. Alternatively, or in addition, method 400 may adjust output of an electric machine via adjusting output of an inverter that supplies electrical current to the electric machine. Method 400 proceeds to exit after delivering the requested driver demand wheel torque.

Thus, the method of FIG. 4 provides for a method for operating a vehicle, comprising: dynamically adjusting a relationship between a mapped driver demand wheel torque input and driver demand wheel torque as a function of road load of a vehicle and a minimum wheel torque; and adjusting torque of a powertrain propulsion source as a function of the relationship between accelerator pedal position and driver demand wheel torque. The method includes where a first breakpoint in the relationship between accelerator pedal position and driver demand wheel torque is dynamically adjusted according to a first accelerator pedal position and the desired vehicle deceleration profile, and where a second breakpoint in the relationship between accelerator pedal position and driver demand wheel torque is dynamically adjusted according to a second accelerator pedal position and the road load of the vehicle. The method includes where the relationship includes a lead-in region, a middle segment, and a lead-out region, and where the lead-in region and lead-out region have lower gains than the middle segment. The method includes where the first accelerator pedal position is less than the second accelerator pedal position, and where the second accelerator pedal position is a position at which vehicle speed is constant. The method further comprises dynamically adjusting the relationship between accelerator pedal position and driver demand wheel torque as a function of a wheel creep torque. The method includes where the powertrain propulsion source is an electric machine and/or an internal combustion engine. The method includes where the minimum wheel torque is a creep torque when vehicle speed is less than a creep speed, and where the minimum wheel torque is a desired deceleration profile when vehicle speed is greater than the creep speed.

The method of FIG. 4 also provides for a method for operating a vehicle, comprising: adjusting a breakpoint of a wheel torque map according to a predetermined wheel creep torque when vehicle speed is less than a threshold speed; adjusting the breakpoint according to a wheel torque that generates a desired vehicle deceleration when vehicle speed is greater than the threshold speed; generating a wheel torque demand via the wheel torque map that includes the break point; and generating a wheel torque from the wheel torque demand. The method further comprises adjusting a second breakpoint of the wheel torque map according to a road load of the vehicle. The method further comprises adjusting a second breakpoint of the wheel torque map according to a creep torque plus an offset torque value. The method includes where the first breakpoint and the second breakpoint define a lead-in region of the wheel torque map. The method includes where the lead-in region describes a relationship between a mapped driver demand wheel torque input and a driver demand wheel torque for accelerator pedal positions that are less than or equal to a threshold position. The method includes where the driver demand wheel torque at the threshold position is a road load of the vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle, comprising:
dynamically adjusting a relationship between mapped driver demand wheel torque input and driver demand wheel torque as a function of road load of a vehicle and a minimum wheel torque; and
adjusting torque of a powertrain propulsion source as a function of the relationship between accelerator pedal position and driver demand wheel torque.

2. The method of claim 1, where a first breakpoint in the relationship between accelerator pedal position and driver demand wheel torque is dynamically adjusted according to a first accelerator pedal position and the minimum wheel torque, and where a second breakpoint in the relationship between accelerator pedal position and driver demand wheel torque is dynamically adjusted according to a second accelerator pedal position and the road load of the vehicle.

3. The method of claim 2, where the relationship includes a lead-in region, a middle segment, and a lead-out region, and where the lead-in region and lead-out region have lower gains than the middle segment.

4. The method of claim 2, where the first accelerator pedal position is less than the second accelerator pedal position, and where the second accelerator pedal position is a position at which vehicle speed is constant.

5. The method of claim 1, further comprising dynamically adjusting the relationship between accelerator pedal position and driver demand wheel torque as a function of a wheel creep torque.

6. The method of claim 1, where the powertrain propulsion source is an electric machine and/or an internal combustion engine.

7. The method of claim 1, where the minimum wheel torque is a creep torque when vehicle speed is less than or equals to a creep speed, and where the minimum wheel torque is or is equal to a desired deceleration profile when vehicle speed is greater than the creep speed.

8. A system for operating a powertrain, comprising:
a propulsion source; and
a controller including executable instructions stored in non-transitory memory that cause the controller to adjust a torque of the propulsion source in response to a table or function that describes a relationship between a mapped driver demand wheel torque input and a driver demand wheel torque, the table or function including a lead-in region that is defined by two breakpoints, the two breakpoints are dynamically adjustable according to vehicle operating conditions.

9. The system of claim 8, where a first of the two breakpoints defines a minimum wheel torque.

10. The system of claim 9, where driver demand wheel torque of the lead-in region decreases as an accelerator pedal application amount decreases up to where the minimum wheel torque is reached.

11. The system of claim 8, where the propulsion source is an internal combustion engine.

12. The system of claim 8, where the propulsion source is an electric machine.

13. The system of claim 8, where the lead-in region begins at zero accelerator pedal input, and where the lead-in region ends when accelerator pedal position is at a position where driver demand torque is equal to a road load of a vehicle.

14. The system of claim 8, where the lead-in region ends when driver demand torque is equal to creep torque plus an offset torque value.

15. A method for operating a vehicle, comprising:
adjusting a breakpoint of a wheel torque map according to a predetermined wheel creep torque when vehicle speed is less than a threshold speed;
adjusting the breakpoint according to a wheel torque that generates a desired vehicle deceleration when vehicle speed is greater than the threshold speed;
generating a wheel torque demand via the wheel torque map that includes the break point; and
generating a wheel torque from the wheel torque demand.

16. The method of claim 15, further comprising adjusting a second breakpoint of the wheel torque map according to a road load of the vehicle.

17. The method of claim 15, further comprising adjusting a second breakpoint of the wheel torque map according to a creep torque plus an offset torque value.

18. The method of claim 17, where the first breakpoint and the second breakpoint define a lead-in region of the wheel torque map.

19. The method of claim 18, where the lead-in region describes a relationship between a mapped driver demand wheel torque input and a requested driver demand wheel torque for accelerator pedal positions that are less than or equal to a threshold position.

20. The method of claim 19, where the driver demand wheel torque at the threshold position is a road load of the vehicle.

* * * * *